(12) United States Patent
Billy et al.

(10) Patent No.: US 11,981,165 B2
(45) Date of Patent: May 14, 2024

(54) METHOD FOR LOCATING WHEELS OF A MOTOR VEHICLE

(71) Applicant: Continental Automotive Technologies GmbH, Hannover (DE)

(72) Inventors: Stéphane Billy, Toulouse (FR); Rachid Benbouhout, Toulouse (FR); Jérôme Lee, Toulouse (FR)

(73) Assignee: Continental Automotive Technologies GmbH (DE)

( * ) Notice: Subject to any disclaimer, the term of this patent is extended or adjusted under 35 U.S.C. 154(b) by 0 days.

(21) Appl. No.: 18/276,727

(22) PCT Filed: Feb. 16, 2022

(86) PCT No.: PCT/EP2022/053808
§ 371 (c)(1),
(2) Date: Aug. 10, 2023

(87) PCT Pub. No.: WO2022/179913
PCT Pub. Date: Sep. 1, 2022

(65) Prior Publication Data
US 2024/0034106 A1   Feb. 1, 2024

(30) Foreign Application Priority Data

Feb. 26, 2021 (FR) ..................... 2101896

(51) Int. Cl.
*B60C 23/04* (2006.01)
*G01P 13/04* (2006.01)
(Continued)

(52) U.S. Cl.
CPC .......... *B60C 23/0416* (2013.01); *G01P 13/04* (2013.01); *G01S 13/0209* (2013.01); *G01S 13/08* (2013.01)

(58) Field of Classification Search
CPC ... B60C 23/0447; B60C 23/0416; G01P 3/04; G01S 13/0209; G01S 13/08; G01S 13/931
See application file for complete search history.

(56) References Cited

U.S. PATENT DOCUMENTS 5,808,190 A   9/1998   Ernst
6,112,587 A   9/2000   Oldenettel
(Continued)

FOREIGN PATENT DOCUMENTS

EP   0806306 A2   11/1997
EP   0895879 A2   2/1999
(Continued)

OTHER PUBLICATIONS

International Search Report and Written Opinion for International Application No. PCT/EP2022/053808, dated May 16, 2022, 12 pages.

(Continued)

*Primary Examiner* — Peter M Bythrow
(74) *Attorney, Agent, or Firm* — Buchanan Ingersoll & Rooney PC

(57) ABSTRACT

A method for locating wheels of a motor vehicle. The vehicle including at least one central processing unit which includes a main ultra-wideband radio frequency transceiver and a plurality of wheel units, each including a secondary ultra-wideband radio frequency transceiver adapted for communicating with the main transceiver. The method includes at least one step of measuring the distance between the main transceiver and the secondary transceiver to be located, by analyzing the propagation time of an exchanged message, and a step of locating the wheel unit associated with the secondary transceiver to be located, on the basis of the distance measured in the measurement step.

5 Claims, 1 Drawing Sheet

(51) Int. Cl.
*G01S 13/02* (2006.01)
*G01S 13/08* (2006.01)

(56) References Cited

U.S. PATENT DOCUMENTS

| | | | | |
|---|---|---|---|---|
| 7,924,147 B2* | 4/2011 | Mathias | ............... | B60C 23/0416 73/146 |
| 10,449,810 B2 | 10/2019 | Guinart et al. | | |
| 2004/0055372 A1* | 3/2004 | Lefaure | ............... | B60C 23/0416 73/146.5 |
| 2005/0078001 A1* | 4/2005 | Lefaure | ................... | G01S 11/06 340/686.1 |
| 2008/0033608 A1* | 2/2008 | Baumgartner | .......... | G01P 13/04 701/33.7 |
| 2009/0157250 A1* | 6/2009 | Costes | ................ | B60C 23/0416 701/31.4 |
| 2011/0071737 A1* | 3/2011 | Greer | .................. | B60C 23/0489 701/49 |
| 2011/0313623 A1* | 12/2011 | Greer | .................. | B60C 23/0437 701/49 |
| 2012/0116607 A1* | 5/2012 | Guinart | ..................... | G01D 5/12 701/1 |
| 2013/0218364 A1* | 8/2013 | Juzswik | .............. | B60C 23/0416 701/1 |
| 2014/0308971 A1* | 10/2014 | O'Brien | ................. | H04W 4/023 455/456.1 |
| 2015/0233711 A1* | 8/2015 | Guinart | ............... | B60C 23/0488 702/150 |
| 2016/0129735 A1* | 5/2016 | Bettecken | ........... | B60C 23/0489 701/300 |
| 2017/0106706 A1* | 4/2017 | Bettecken | ........... | B60C 23/0488 |
| 2017/0318423 A1* | 11/2017 | Reisinger | .............. | H04W 12/08 |
| 2017/0368892 A1* | 12/2017 | Heuermann | ........... | G01N 22/00 |
| 2021/0199791 A1* | 7/2021 | Podkamien | ........... | B60C 23/067 |

FOREIGN PATENT DOCUMENTS

| | | |
|---|---|---|
| FR | 2911712 A1 | 7/2008 |
| FR | 2974033 A1 | 10/2012 |
| KR | 20180012536 A | 2/2018 |

OTHER PUBLICATIONS

International Search Report and Written Opinion for International Application No. PCT/EP2022/053808, dated May 16, 2022, 10 pages (French).
French Search Report for French Application No. 2101896, dated Sep. 28, 2021 with translation, 9 pages.
English Translation of the Written Opinion for International Application No. PCT/EP2022/053808, dated May 16, 2022, 5 pages.

* cited by examiner

METHOD FOR LOCATING WHEELS OF A MOTOR VEHICLE

CROSS REFERENCE TO RELATED APPLICATIONS

This application is the U.S. National Phase Application of PCT International Application No. PCT/EP2022/053808, filed Feb. 16, 2022, which claims priority to French Patent Application No. 2101896, filed Feb. 26, 2021, the contents of such applications being incorporated by reference herein.

FIELD OF THE INVENTION

The present patent application relates to a method for locating the wheels of a motor vehicle, this method having applications notably in the field of tire monitoring systems for motor vehicles.

BACKGROUND OF THE INVENTION

For security purposes, it is known to equip a motor vehicle with a monitoring system known by the acronym "TPMS" (Tire Pressure Monitoring System).

Such a monitoring system generally has a central processing unit, wheel units, each of which equips an associated wheel of the vehicle, and a radio frequency communications assembly suitable for ensuring communication between each wheel unit and the central processing unit.

The central unit has an electronic processor known by the abbreviation "ECU" (Electronic Control Unit).

Each wheel unit comprises an electronic assembly of sensors in order notably to detect an anomaly with the wheel. These sensors may, for example, be a tire inflation pressure sensor, a temperature sensor and a wheel acceleration sensor.

In addition, each wheel unit has a battery and a memory.

It is essential to know the location of each wheel unit, in order to utilize the data transmitted by the wheel units. More particularly, the location information is necessary in order to know the recommended pressure threshold to be applied, depending on whether it is a question of a front wheel or a rear wheel, and also to display the current pressure values at the associated wheel.

This location constraint remains present throughout the life of the vehicle, notably after wheels have been changed or the positions of these wheels have been swapped.

There is a known type of method for locating the wheels of a vehicle by angular correlation, such as, notably, the methods described in EP-0806306, EP-0895879 and FR-2974033, each incorporated herein by reference, the principle of which is based on the correlation between the signals delivered by an angle sensor fitted on one wheel and the signals delivered by a speed sensor fitted on the vehicle near this wheel.

Typically, this type of method using angular correlation is applied to signals delivered by the speed sensors of an active safety system such as an anti-lock braking system (ABS) and an electronic stability program (ESP).

The prior art, notably the methods of detection by angular correlation, requires a complex architecture and the synchronization of the radio frequency messages.

SUMMARY OF THE INVENTION

An aspect of the present invention aims to solve these drawbacks by proposing a method for locating the wheels of a motor vehicle which is quick and dispenses with the angle measurements made by the active safety system.

An aspect of the invention, and others that will become apparent from reading the following description, is achieved by a method for locating the wheels of a motor vehicle, said vehicle having at least:
- a central processing unit which comprises a main ultra-wideband radio frequency transceiver, and
- a plurality of wheel units, each comprising an electronic assembly of sensors and a secondary ultra-wideband radio frequency transceiver for communicating with the main transceiver, each wheel unit being mounted on a wheel of the motor vehicle, Said method comprising, at least:
- a step of exchanging at least one message between the main transceiver and the secondary transceiver to be located among said wheel units, the main transceiver sending a dated outgoing message to the secondary transceiver to be located, said secondary transceiver to be located responding by sending a return message to the main transceiver, and then, in the measurement step, the central unit analyzing the propagation time of the outgoing message and the return message in order to measure the distance between the main transceiver and the secondary transceiver to be located.
- a step of measuring the distance between the main transceiver and the secondary transceiver to be located, by analyzing the propagation time of said exchanged message, and
- a step of locating said wheel unit associated with the secondary transceiver to be located in the motor vehicle, on the basis of the distance measured in the measurement step, said method being remarkable in that said secondary transceiver to be located sends an initial message which comprises data representative of the operating parameters of the associated wheel, and which initiates the step of exchange between the main transceiver and the secondary transceiver to be located.

Thus the method according to an aspect of the invention offers an effective solution for locating the wheels of a vehicle with limited technical resources.

According to other optional features of the method according to an aspect of the invention, taken individually or in combination:
- method applied to a motor vehicle, comprising a main transceiver which is centered on a median longitudinal axis of the motor vehicle and a plurality of wheel units, each provided with an accelerometer, said location step comprising a phase of distinguishing the wheels which consists in analyzing the data delivered by the accelerometer to distinguish the direction of rotation of the associated wheel and to distinguish laterally opposed wheels on either side of the median longitudinal axis of the motor vehicle;
- method applied to a motor vehicle, comprising a remote main transceiver which is arranged in the motor vehicle so that the distances between said main transceiver and each secondary transceiver are different from each other. Because of this characteristic, it is possible to dispense with the use of an accelerometer;
- during the location step, the distances measured in the second measurement step are compared with pre-established standard distances, in order to associate each measured distance with at least one secondary transceiver for the purpose of locating said associated wheels.

An aspect of the present invention also relates to a motor vehicle key, comprising at least:
- a central processing unit which comprises a main ultra-wideband radiofrequency transceiver, and
- a plurality of wheel units, each comprising an electronic assembly of sensors and a secondary ultra-wideband radio frequency transceiver for communicating with the main transceiver, each wheel unit being mounted on a wheel of the motor vehicle, and remarkable in that said central unit and/or said wheel units are suitably programmed to implement the method described above.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DESCRIPTION OF THE EMBODIMENTS

Figure 1:
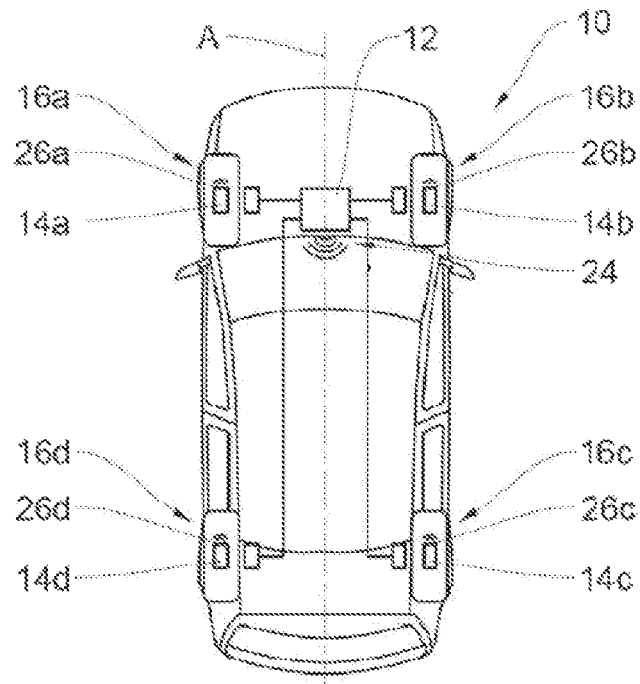
FIG. 1 is a schematic view of a motor vehicle equipped with wheel units and a central unit centered on a median longitudinal axis of the vehicle, to which vehicle the method according to a first embodiment of the invention is applied.

FIG. 1 depicts a motor vehicle 10 which is equipped with a central processing unit 12, and four wheel units 14a, 14b, 14c, 14d which are each mounted on an associated wheel 16a, 16b, 16c, 16d.

The four wheels 16a, 16b, 16c, 16d comprise a left-hand front wheel referenced 16a, a right-hand front wheel referenced 16b, a right-hand rear wheel referenced 16c and a left-hand rear wheel referenced 16d, the pair of left-hand wheels 16a, 16d being opposed laterally about a median longitudinal axis A to the pair of right-hand wheels 16b, 16c.

The central unit 12 notably includes an electronic processor known by the abbreviation "ECU" (Electronic Control Unit), and a memory.

Additionally, the central unit 12 includes a main radio frequency transceiver 24.

Each wheel unit 14a, 14b, 14c, 14d, which is part of a monitoring system of the "TPMS" type, comprises an electronics housing containing an assembly of sensors which are dedicated to measuring parameters such as the pressure and the temperature of the tire with which the associated wheel 16a, 16b, 16c, 16d is equipped. Each wheel unit 14a, 14b, 14c, 14d also comprises a battery and a memory (not depicted).

Each wheel unit 14a, 14b, 14c, 14d is also equipped with a secondary transceiver 26a, 26b, 26c, 26d adapted for communicating and transmitting messages with the main transceiver 24.

The messages exchanged between the main transceiver 24 and each secondary transceiver 26a, 26b, 26c, 26d notably include data representative of operating parameters of each associated wheel 16a, 16b, 16c, 16d and an identification code for each associated wheel unit 14a, 14b, 14c, 14d.

The communication takes place according to a communication protocol allowing a bidirectional data exchange, using ultra-wideband radio frequency radiation.

The method according to an aspect of the invention comprises a first exchange step consisting in exchanging messages, or signals, between the main transceiver 24 and each secondary transceiver 26a, 26b, 26c, 26d to be located subsequently.

More particularly, in the exchange step, the main transceiver 24 sends a dated outgoing message to the secondary transceiver 26a, 26b, 26c, 26d to be located, for example the secondary transceiver 26a associated with the left-hand front wheel unit 14a, and the secondary transceiver 26a to be located then responds by sending a return message to the main transceiver 24.

According to a preferred embodiment of the invention, the secondary transceiver 26a to be located sends an initial message which comprises data representative of the operating parameters of the associated wheel 16a, and which initiates the step of exchange between the main transceiver 24 and the secondary transceiver 26a to be located. This is because, in the context of a monitoring system of the TPMS type, it is common for each secondary transceiver 26a, 26b, 26c, 26d to send a message to the main transceiver 24 at regular intervals or on the occasion of an event, in order to transmit the operating parameters of the associated wheel 16a, 16b, 16c, 16d to the central unit 12.

The first exchange step is repeated for each secondary receiver 26a, 26b, 26c, 26d of each wheel unit 14a, 14b, 14C, 14d, and is followed by a second step of measuring the distance between the main transceiver 24 and the secondary transceiver 26a to be located.

The second step of distance measurement consists in analyzing the propagation time of the outgoing message and the return message in order to measure the distance between the main transceiver 24 and the secondary transceiver 26a to be located.

For example, the distance between the main transceiver 24 and the secondary transceiver 26a to be located is calculated by multiplying the propagation time of the outgoing message and the return message by the speed of light, then dividing the result by two, while also taking into account the response latency time of the secondary transceiver 26a to be located, which is known. This is because electromagnetic radiation propagates in a vacuum at the speed of light (regardless of its frequency). A signal sent by a transceiver is physically an electromagnetic wave which is radiated by an antenna and therefore propagates at the speed of light.

The calculation of a distance on the basis of the propagation time, or time of flight, of an ultra-wideband radio frequency message is known from the prior art and will therefore not be detailed further.

The second measurement step is repeated for each secondary receiver 26a, 26b, 26c, 26d of each associated wheel unit 14a, 14b, 14c, 14d.

After the second measurement step, the method comprises a third step of locating the wheel unit 14a, or the wheel 16a, associated with the secondary transceiver 26a to be located in the motor vehicle 10, on the basis of the distance measured in the preceding second measurement step.

According to a first embodiment of the method according to the invention, illustrated in FIG. 1, the main transceiver 24 is centered on the median longitudinal axis A of the motor vehicle 10.

Because of the centered position of the main transceiver 24, the left-hand front wheel unit 14a and the right-hand front wheel unit 14b are equidistant from the main transceiver 24. Similarly, the right-hand rear wheel unit 14c and the left-hand rear wheel unit 14d are equidistant from the main transceiver 24.

In order to distinguish two equidistant wheel units 14a, 14b, 14c, 14d, it is necessary to determine their respective directions of rotation, or more precisely the directions of rotation of the associated wheels 16a, 16b, 16c, 16d.

This is because a wheel arranged on the left and an opposite wheel arranged on the right of the median axis A of the motor vehicle 10 rotate in opposite directions of rotation.

For this purpose, still with reference to the first embodiment, each wheel unit 14a, 14b, 14c, 14d) is equipped with an accelerometer (not depicted) which is adapted to deliver to the central unit 12 a signal representative of the direction of rotation of the associated wheel 16a, 16b, 16c, 16d.

The location step also comprises a phase of distinguishing the wheels 16a, 16b, 16c, 16d, for the purpose of distinguishing the direction of rotation of the wheels 16a, 16b, 16c, 16d, and consequently their lateral position, by analyzing the value of radial acceleration delivered by the associated accelerometer.

The phase of distinguishing the wheels 16a, 16b, 16c, 16d also makes it possible to distinguish two twin wheels on the same axle. Twin wheels of this type are fitted, notably, on heavy goods vehicles.

Figure 2:
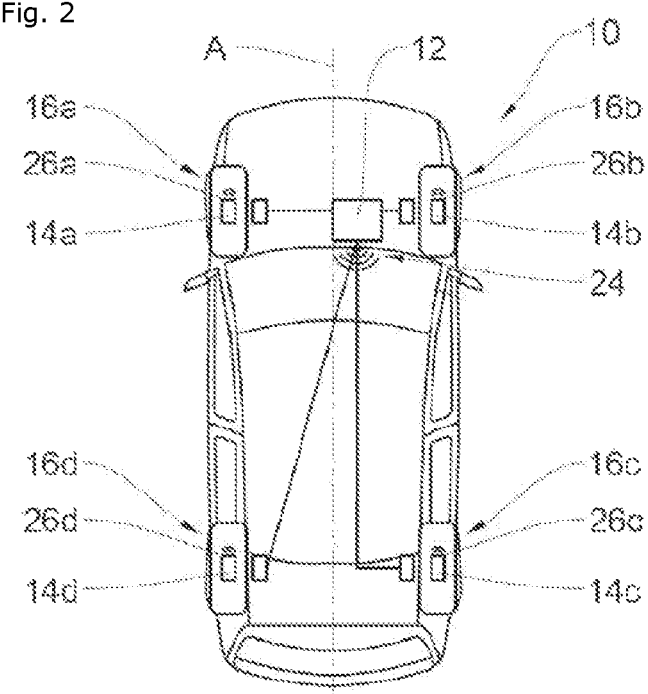
FIG. 2 is a schematic view similar to the view of FIG. 1, with the central unit in a remote position, to which the method according to a second embodiment of the invention is applied.

According to a second embodiment of the method according to the invention, illustrated in FIG. 2, the main transceiver 24 is off-centered with respect to the median longitudinal axis A of the motor vehicle 10; that is to say, the main transceiver 24 is arranged in the motor vehicle 10 so that the distances between the main transceiver 24 and each secondary transceiver 26a, 26b, 26c, 26d are different from each other.

Thus, according to the second embodiment, in the third location step the distances measured in the second measurement step are compared with pre-established standard distances, in order to associate each measured distance with the appropriate secondary transceiver 26a, 26b, 26c, 26d, in order to locate each wheel unit 14a, 14b, 14c, 14d and therefore each wheel 16a, 16b, 16c, 16d.

For this purpose, the pre-established standard distances of each secondary transceiver 26a, 26b, 26c, 26d from the main transceiver 24 are recorded in a calibration table stored in the memory of the central unit 12.

As will be apparent, the method according to the second embodiment is advantageously applicable to a motor vehicle 10 that has no accelerometer.

The invention claimed is:

1. A method for locating wheels of a motor vehicle, said vehicle comprising at least:
   a central processing unit which comprises a main ultra-wideband radio frequency transceiver, and
   a plurality of wheel units, each comprising an electronic assembly of sensors and a secondary ultra-wideband radio frequency transceiver for communicating with the main transceiver, each wheel unit being mounted on a wheel of the motor vehicle,
   the method comprising at least:
   a step of exchanging at least one message between the main transceiver and the secondary transceiver to be located among said wheel units, the main transceiver sending a dated outgoing message to the secondary transceiver to be located, said secondary transceiver to be located responding by sending a return message to the main transceiver, and then, in the measurement step, the central unit analyzing the propagation time of the outgoing message and the return message in order to measure the distance between the main transceiver and the secondary transceiver to be located,
   a step of measuring the distance between the main transceiver and the secondary transceiver to be located, by analyzing the propagation time of said exchanged message, and
   a step of locating said wheel unit associated with the secondary transceiver to be located in the motor vehicle, on the basis of the distance measured in the measurement step,
   wherein said secondary transceiver to be located sends an initial message which comprises data representative of the operating parameters of the associated wheel, and which initiates the step of exchange between the main transceiver and the secondary transceiver to be located.

2. The method as claimed in claim 1, applied to a motor vehicle comprising a main transceiver which is centered on a median longitudinal axis of the motor vehicle and a plurality of wheel units, each provided with an accelerometer, said location step comprising a phase of distinguishing the wheels which consists in analyzing the data delivered by the accelerometer to distinguish the direction of rotation of the associated wheel and to distinguish laterally opposed wheels on either side of the median longitudinal axis of the motor vehicle.

3. The method as claimed in claim 1, applied to a motor vehicle comprising a remote main transceiver which is arranged in the motor vehicle so that the distances between said main transceiver and each secondary transceiver are different from each other.

4. The method as claimed in claim 1, wherein, in the location step, the distances measured in the second measurement step are compared with pre-established standard distances, in order to associate each measured distance with at least one secondary transceiver for the purpose of locating said associated wheels.

5. A motor vehicle comprising at least:
   a central processing unit which comprises a main ultra-wideband radio frequency transceiver, and
   a plurality of wheel units, each comprising an electronic assembly of sensors and a secondary ultra-wideband radio frequency transceiver for communicating with the main transceiver, each wheel unit being mounted on a wheel of the motor vehicle,
   wherein said central unit, and/or said wheel units are suitably programmed to implement the method according to claim 1.

* * * * *